United States Patent [19]
Woodbury

[11] 3,868,668
[45] Feb. 25, 1975

[54] SIGNAL LIGHT FOR FISHING

[76] Inventor: Luther A. Woodbury, 1340 Garden Ave., Waterloo, Iowa 50701

[22] Filed: Aug. 6, 1973

[21] Appl. No.: 386,091

[52] U.S. Cl............... 340/279, 200/61.14, 200/160, 43/17
[51] Int. Cl........................................... A01k 93/00
[58] Field of Search ......... 340/279, 283; 200/61.13, 200/61.18, 61.14, 166 J, 166 M, 160, 325, 65, 67 D; 43/17

[56] References Cited
UNITED STATES PATENTS

| | | | |
|---|---|---|---|
| 1,778,097 | 10/1930 | Wachsman | 200/61.18 |
| 2,619,559 | 11/1952 | Schenkel | 340/279 X |
| 2,921,546 | 1/1960 | Vossen | 200/61.18 X |
| 3,091,881 | 6/1963 | Evans | 43/17 |
| 3,096,945 | 7/1963 | Wildi | 200/61.18 X |
| 3,618,068 | 11/1971 | Sloan | 43/17 X |

Primary Examiner—John W. Caldwell
Assistant Examiner—William W. Wannisky
Attorney, Agent, or Firm—Henderson & Strom

[57] ABSTRACT

A signal light having a casing and a bulb similar to a penlight is adapted to be fastened to a rod holder or directly to a rod. A switch assembly has approximately the dimensions of a penlight cell and is positioned within the housing of the signal light to control lighting of the bulb. The switch has a pair of fixed contacts and a rotary contact that is operated from an arm that extends from the housing. The line attached to the rod is threaded through a hook pivotally fastened to the outer end of the arm, and when the line is drawn taut, the arm is rotated to close the switch for lighting the bulb. The switch has a spring return position until the tension on the line exceeds a predetermined force, and then for a greater force, the rotor is operated through a snap position where it must be returned manually to open the light circuit. An adjustment is provided for determining the tension that is required to operate the switch.

7 Claims, 7 Drawing Figures

PATENTED FEB 25 1975    3,868,668

SIGNAL LIGHT FOR FISHING

BACKGROUND OF THE INVENTION

This invention relates to signaling devices to be attached to rods for fishing and operated by tension on their lines.

Various simple signaling devices have been attached to lines or rods. When a fish jerks the line of a rod having a signal device, a signal alerts a person who is relaxing nearby. Usually these signal devices do not have a sensitivity adjustment to change the amount of tension required on a line to actuate the device, and commonly no provision is made for continuing a signal after the line has become taut and then becomes loose again.

BRIEF DESCRIPTION OF THE INVENTION

A signal light has a housing adapted to be attached to a rod. A switch for controlling the light has an actuator arm extending outwardly from the housing at an angle to the direction of the line attached to the rod such that the outer end of the arm is not quite in alignment with the rod. The line is threaded through the end of the arm, and since the line is deflected by the arm, the arm is urged to rotate when the line becomes taut for operating the switch and controlling the light.

The housing of the signal light may be attached by clamps directly to a rod, or attached to a rod holder that holds the rod in a desired fixed position. The housing of the signal light is similar to that of a penlight except that it has sufficient length to accommodate the control switch within the housing in line with a penlight cell. A two-cell penlight can be converted for use as a signal light by using a low-voltage bulb normally used in a one-cell penlight, using one rather than two cells, and installing a switch according to this invention in place of the other cell.

When the line is taut, a circuit for operating the light is completed from the single cell through the switch of this invention to the back of the conductive case of the penlight. The actuator arm rotates a movable contact to engage it with a fixed contact connected to the cell. When the line is loose, the contacts are urged open by an adjustable, helical spring. When moderate force is applied to the actuator arm by the fish line, the movable contact is rotated until it engages the fixed contact. The fixed contact has two adjacent ends spread apart slightly, and one end may be slightly shorter than the other. When the force is moderate and varying, the movable contact engages the shorter leaf-spring contact intermittently to cause the light to flicker. If the contact is moderate and steady, the light remains on until the tension on the line is removed. As the force on the line increases, the end of the movable contact is moved past the longer leaf spring to obtain a snap-switch action, and the helical spring attached to the movable contact holds the movable contact against the leaf spring to maintain the light on constantly until an additional force is applied manually to the arm to snap the movable contact back to its normal position.

DESCRIPTION OF THE PREFERRED EMBODIMENTS

Figure 1:
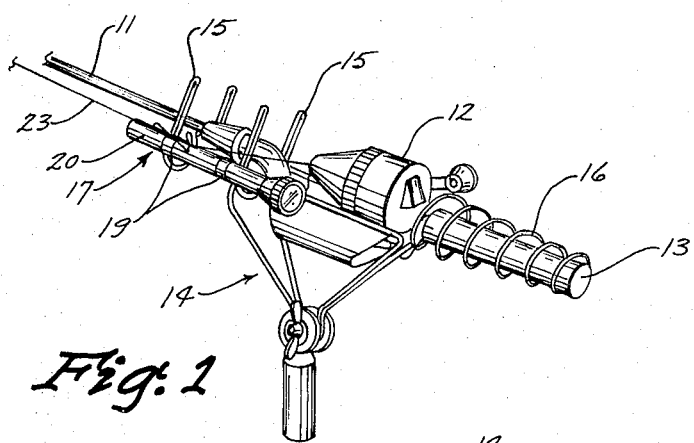
FIG. 1 is an oblique, side view of the signal light of this invention attached to a rod holder.
Figure 2:
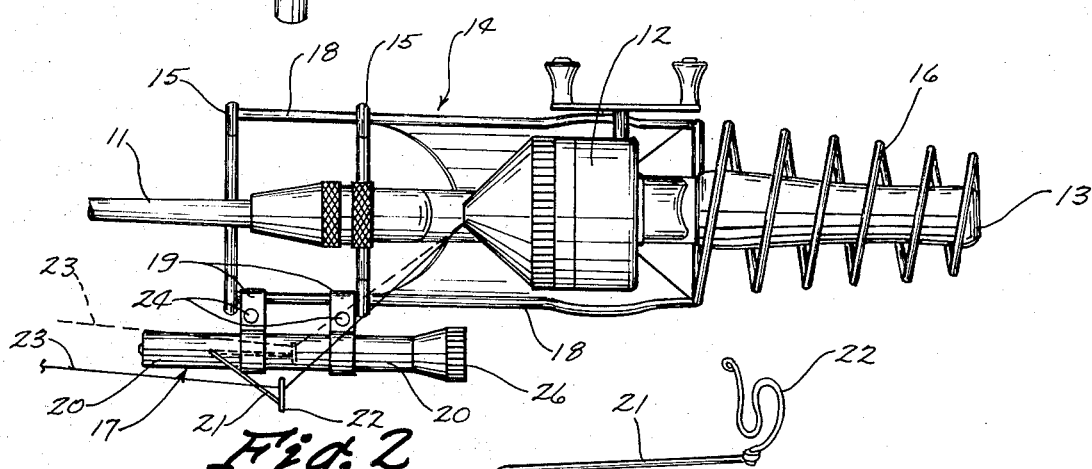
FIG. 2 is a top view of the signal light of FIG. 1.

In FIGS. 1 and 2, a rod 11 including a reel 12 and its handle 13 is positioned in a prior rod holder 14. The rod holder 14 includes a frame 18, as shown in FIG. 2, a pair of U-shaped members 15 for holding the rod 11 as it extends in front of the reel 12, and a spiral spring 16 for holding the handle 13. A signal light 17 is mounted to the rod holder 14 parallel to the rod 11 and in front of the reel 12. The signal light has a cylindrical, metal housing 20 similar to that used for penlights such that it can receive penlight cells or batteries. The cylindrical housing 20 is fastened to the frame 18 by a pair of spaced clamps 19 that substantially encircle the housing and a rod-like portion of the frame 18. In a usual manner, the screws 24 are inserted through the clamps between the housing 20 and the frame 18 and are tightened sufficiently to secure the signal light 17 to the frame. An actuator arm 21 for controlling a switch within the housing 20 of the signal light extends upwardly and outwardly from the housing 20. The outer end of the arm 21 has a flattened S-shaped hook 22 through which passes the section of the line 23 between the reel 22 and the opposite end of the rod 11. As described below, the arm 21 is normally urged outwardly by a spring tension, and when the line is drawn taut to cause the arm 21 to rotate toward a parallel position with the housing 20, a flashlight bulb 25, as shown in FIG. 3, is lighted.

Figure 4:
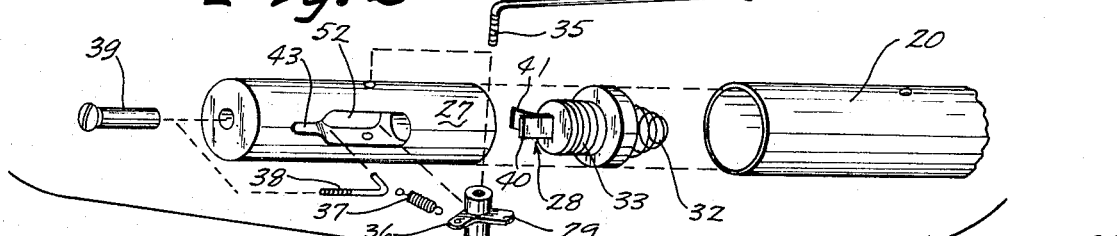
FIG. 4 is an exploded view of the switch shown in FIG. 3.
Figures 3, 7:
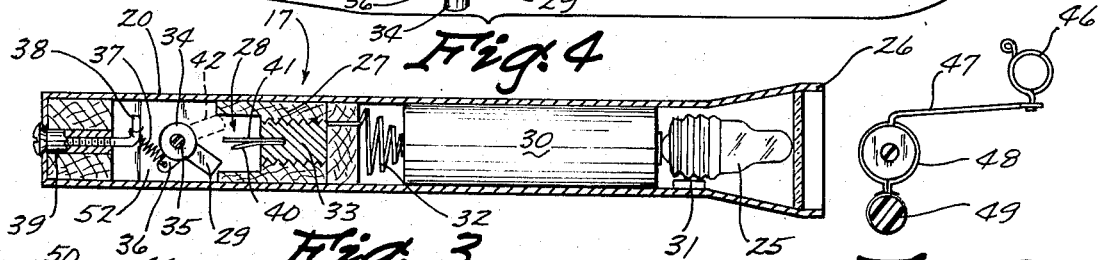
FIG. 3 is a longitudinal view of the signal light showing a cross-section of a switch and its connection to a flashlight cell and a bulb.
FIG. 7 is a cross-sectional view taken on lines 7—7 of FIG. 6 to show more clearly the actuating arm of the switch.

The operation of the signal light can be more readily understood with reference to FIG. 3 and also to FIG. 4 for details of the switch. The switch of FIG. 4 is inserted in that end of the housing 20 opposite the bulb 25 that is mounted in the usual manner in a head 26. A flashlight cell 30 is inserted in the housing 20 so that its center electrode engages the center contact of the bulb 25 in the usual manner. Also, a metal tab 31 connects the outer contact of the bulb 25 to the metal case 20 of the signal light.

The switch of FIG. 4 has an insulating housing 27 for supporting a fixed contact 28 and a movable contact 29. A spiral spring contact 32 extends longitudinally from the end of the housing 27 to contact the outer electrode of the battery 30, and the inner end of the spiral spring 32 is connected to an adjacent end of a central, conductive mounting 33 that is secured by appropriate screw threads in the insulating switch housing 27. A pair of fixed leaf spring contacts 28 of slightly different lengths extend outwardly from the other end of the metal screw mounting 33. The movable contact or switch blade 29 extends from a rotor 34 that is mounted coaxially on an angle end portion 35 of the arm 21. The end portion 35 is rotatably mounted through the insulating switch housing 27, the switch housing having a central cavity 52 in which the rotor 34 is mounted.

A tab 36 is mounted at approximately 90 degrees from the rotary contact 29, and has a hole in its outer end to receive the end of a helical, tension spring 37. The other end of the spring 37 is connected to one end of an angle rod 38, and the other end of the rod 38 has threads to engage internal threads of an adjustable screw member 39 that extends through the adjacent end of the housing 20. The spring 37 urges the rotary contact 29 in a direction away from the fixed contacts 28 against the insulating switch housing 27. When the line 23 is drawn tight so that the switch arm 21 is in the position shown by the dashed lines in FIG. 2, the rotary contact 29 first comes in contact with the short contact 40 of the fixed contacts 28. Obviously, a circuit is then completed from the outer electrode of the cell 30, through the spiral spring 32, the fixed contact mounting 33, the fixed contact 40, the rotary contact 29, the spiral spring 37, the adjustable screw member 39, to the conductive housing 20 of the signal light. In a conventional manner, the circuit is completed from the housing 20 through the metal tab 31, and the bulb 25 to the center electrode of the cell 30.

When a fish is biting and the tension on the line 23 is light and intermittent, the bulb 25 flickers as the contact 29 engages intermittently the leaf 40 of the fixed contacts 28. If the force on the line is enough to overcome the tension of the spring 37 and is constant, the bulb 25 will be lighted until the tension is removed from the line 23 so that the spring 37 opens the contacts 29 and 40 of the switch. As the tension on the line increases, the rotary contact 29 is forced past a long leaf 41 in a snap action to the position 42 shown in dash lines on FIG. 3. When the tension on the line 23 is removed, the spring 37 causes the rotary contact 29 to bear against the long leaf 41 of the fixed contacts 28, but the spring 37 does not have sufficient force to snap the rotary contact 29 back to an open position. The bulb 25 is then lighted to provide a signal constantly until the arm 22 is returned manually to a slanting position for turning the rotary contacts 29 to an open position.

The screw member 39 may be adjusted to move the angle rod longitudinally for determining the tension of the helical spring 37. As shown in FIG. 4, the bent end of the rod 38 fits in the slot 43 of the insulating switch housing 27 to prevent its rotation while the screw member 39 is rotated. This adjustment provides an easy means for determining the amount of tension that is required on line 23 to close the contacts 29 and 40 and therefore to light the bulb 25.

The angle end 35 of the arm 21 may be attached to the switch rotor 34 in a usual manner. With reference to FIGS. 2 and 4, the end 35 of the arm 21 and the axial bore of the rotor 34 are threaded, and while the rotor 34 is axially aligned with a hole through the wall of the housing 20 of the signal light, the end 35 is screwed into the axial bore of the rotor 34. Alternately, the end 35 may be soldered within the axial bore of the rotor 34 and a slot 44, as shown in FIG. 5, in the end of the wall of the housing 45 may be provided to receive the arm 47 of the switch while the switch, according to FIG. 4, is inserted from the end of the housing 45.

The outer end of the arm 21 of FIG. 4 has a flattened S-shaped hook or eye 22 for receiving the line 23. An adjacent portion of the line 23 is moved outwardly below the inner, curved portion of the eye, and then the line will be positioned within the upper, curved portion.

Figures 5, 6:
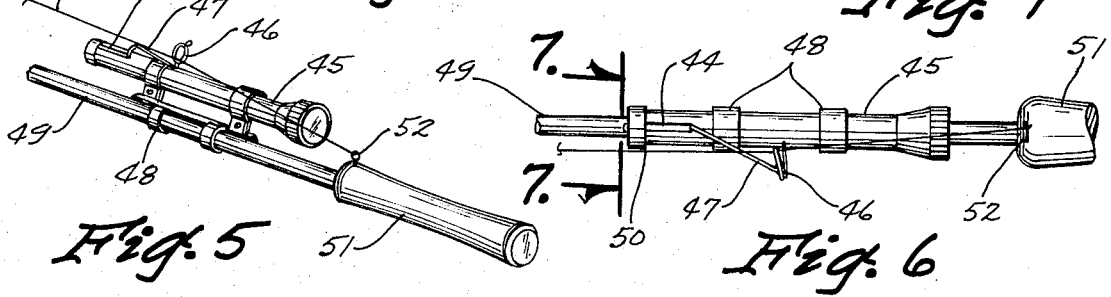
FIG. 5 is a side, oblique view of a signal light attached directly to a fishing rod.
FIG. 6 is a top view of the switch shown in FIG. 5.

A different eye 46 is shown pivotally attached to the outer end of the arm 47 of FIGS. 5–7. This eye is a 1½ turn spiral, and the line 50 is placed within the spiral by moving a portion outwardly and upwardly over the free end of the spiral.

In FIGS. 5 and 6, the housing 45 of a signal light is shown fastened by a clamp 48 directly to a rod 49. A line 50 is fastened at eyelet 52 to a handle 51 and is threaded through the eye 46, as described above. Obviously, the line 50 can be easily removed from the eye 46 by moving the portion of the line through the eye upwardly, then outwardly and downwardly.

I claim:

1. A signal light for a rod comprising: a housing for said signal light adapted to be secured with respect to a rod, a switch assembly, a cell and a bulb within said housing, said switch assembly having a rotary contact and a fixed contact, said contacts, said cell and said bulb being connected in a series circuit, said switch assembly having an actuator arm with one end attached to said rotary contact, spring biasing means for urging said rotary contact in an open position where it is not in engagement with said fixed contact and to position said arm in an outwardly slanting direction with respect to rod to which said signal light is attached, an eye through which a line can slip attached to the other end of said actuator arm, and said switch assembly operated to close said rotary and fixed contacts in response to a line through said eye being drawn taut along the rod to which said signal light is attached, said fixed contact comprising two leaf springs in a side to side relationship, one of said leaf springs being significantly shorter than the other leaf spring whereby the force required to move the rotary contact past the two leaf springs is greater in one rotary direction that in the other rotary direction.

2. A signal light as claimed in claim 1 in which said spring biasing means comprises a spring having one end connected to said rotary contact, an adjustable arm connected to the other end of said spring, and said adjustable arm being adjustable to change tension on said spring and thereby to change the amount of force applied to said eye to close said contacts.

3. A signal light as claimed in claim 1 in which said fixed contact has an end nearest said rotary contact overlapping the path of said rotary contact, said rotary contact having first and second closed positions, said rotary contact while in said first closed position being held by moderate force applied to said eye to overcome the force of said spring biasing means sufficiently for contacting the side of said fixed contact first encountered during rotation thereof from said open position, said rotary contact being snapped past said fixed contact to said second closed position in response to application of force above a predetermined amount, said fixed contact retaining said rotary contact in said second closed position resisting the force of said spring biasing means until said arm is rotated manually to said open position.

4. A signal light as claimed in claim 2 in which said switch assembly has an insulating housing, said rotary contact being disposed in an intermediate position in said switch assembly housing, a conductive member secured axially within one end of said housing, said fixed contact extending from said conductive member toward said rotary contact, a conductive spring extending from said conductive member and beyond said one end of said housing to contact one end of said cell.

5. A signal light as claimed in claim 4 wherein said rotary contact has a projection at an angle thereto, said spring biasing means comprises a tension helical spring having one end connected to said projection, a threaded rod and a screw adjustment disposed through the other end of said insulating housing, and the other end of said tension helical spring connected to the inner end of said threaded rod.

6. A signal light as claimed in claim 1 wherein said eye is S-shaped and is pivotally mounted to said other end of said actuator arm.

7. A signal light as defined in claim 1 wherein at least one of said leaf springs is straight in an unflexed condition.

* * * * *